United States Patent
Bury et al.

(10) Patent No.: US 11,223,744 B2
(45) Date of Patent: Jan. 11, 2022

(54) LOCAL COLOR RANGE SELECTION

(71) Applicant: Adobe Inc., San Jose, CA (US)

(72) Inventors: Joshua Michael Bury, Grants Pass, OR (US); Eric Chan, Belmont, MA (US)

(73) Assignee: ADOBE INC., San Jose, CA (US)

( * ) Notice: Subject to any disclaimer, the term of this patent is extended or adjusted under 35 U.S.C. 154(b) by 46 days.

(21) Appl. No.: 15/786,549

(22) Filed: Oct. 17, 2017

(65) Prior Publication Data

US 2019/0116293 A1 Apr. 18, 2019

(51) Int. Cl.
| | |
|---|---|
| *H04N 1/60* | (2006.01) |
| *G06T 5/20* | (2006.01) |
| *G06T 5/00* | (2006.01) |
| *G06T 5/40* | (2006.01) |

(52) U.S. Cl.
CPC .......... *H04N 1/6005* (2013.01); *G06T 5/002* (2013.01); *G06T 5/20* (2013.01); *G06T 5/40* (2013.01); *H04N 1/6008* (2013.01); *H04N 1/6072* (2013.01); *G06T 2207/10024* (2013.01); *G06T 2207/10028* (2013.01)

(58) Field of Classification Search
CPC .... H04N 1/6005; H04N 1/6008; G06T 5/002; G06T 5/40; G06T 5/20; G06T 2207/10028; G06T 2207/10024
See application file for complete search history.

(56) References Cited

U.S. PATENT DOCUMENTS

| | | | |
|---|---|---|---|
| 6,728,401 B1 | 4/2004 | Hardeberg | |
| 8,406,482 B1 * | 3/2013 | Chien | G06K 9/4652 |
| | | | 382/118 |
| 2009/0028403 A1 * | 1/2009 | Bar-Aviv | G16H 50/20 |
| | | | 382/128 |
| 2009/0290042 A1 * | 11/2009 | Shiohara | H04N 1/00132 |
| | | | 348/222.1 |
| 2012/0206479 A1 | 8/2012 | Bryant et al. | |
| 2013/0051663 A1 * | 2/2013 | Krishnaswamy | G06T 7/11 |
| | | | 382/164 |
| 2013/0120442 A1 * | 5/2013 | Dhawan | G06T 3/0012 |
| | | | 345/629 |

(Continued)

FOREIGN PATENT DOCUMENTS

| | | |
|---|---|---|
| WO | 9428490 | 12/1994 |
| WO | 2006028460 | 3/2006 |

OTHER PUBLICATIONS

Examination Report dated Jan. 19, 2021 in corresponding Great Britain Application No. 1813321.5 (4 pages).

(Continued)

*Primary Examiner* — John W Lee
(74) *Attorney, Agent, or Firm* — F. Chau & Associates, LLC

(57) ABSTRACT

Techniques of editing images using a digital image editing tool involve defining a local adjustment that includes, as separate masks, a spatial mask and a range mask. The spatial mask specifies a region of the image to be adjusted and the range mask specifies ranges of colors and tones to be adjusted independent of the region specified by the spatial mask. In applying these masks, when a user changes a setting in the digital image editing tool, the digital image editing tool weights the effect of the setting according to the values of the spatial mask and the range mask for each pixel of the image.

18 Claims, 9 Drawing Sheets

(56) References Cited

U.S. PATENT DOCUMENTS

2013/0235071 A1\* 9/2013 Ubillos .................. G06T 11/60
 345/600
2014/0341442 A1\* 11/2014 Lewis ...................... G06T 7/11
 382/118

OTHER PUBLICATIONS

Examination Report dated Sep. 27, 2021 in corresponding Australian Application No. 2018211310 (5 pages).
Response to Examination Report filed Sep. 29, 2021 in corresponding Australian Patent Application No. 2018211310 (20 pages).
Examination Report dated Oct. 2, 2021 in corresponding Great Britain Application No. 1813321.5 (88 pages).

\* cited by examiner

LOCAL COLOR RANGE SELECTION

TECHNICAL FIELD

This description relates to digital image editing tools.

BACKGROUND

Some photographers edit pictures using a digital image editing tool that runs on a computer. Along these lines, some edits that may be made to a picture using such a digital picture editing tool include adjustments such as exposure, contrast, and color level. Such adjustments may be applied using local adjustment tools, such as a brush, a linear gradient, and/or a radial gradient.

For example, suppose that a user wants to edit a picture of a tree with red leaves in foliage and a red building on the ground, against a blue sky in the background. The user might want to brighten the red leaves but leave other red colors in the picture darker. In a conventional approach to editing images using a digital picture editing tool, the user may define a mask defining a region in which certain color and tonal adjustments may be applied. In the above example, such a mask weights the red saturation high in the leaves and low by selecting regions that include the red leaves and applying a brush to those regions.

SUMMARY

In one general aspect, a method can include obtaining, by processing circuitry of a computer configured to edit images, an image including a plurality of pixels, each of the plurality of pixels having values of a plurality of parameters defining a color and tone. The method can also include generating, by the processing circuitry, a spatial mask defining a region of the image, the spatial mask including, for each pixel of the plurality of pixels, a respective value indicating whether that pixel is included in the region. The method can further include generating, by the processing circuitry, a range mask defining a range of values of a specified parameter of the plurality of parameters, the range mask including, for each pixel of the plurality of pixels, a respective value indicating whether the value of the specified parameters of that pixel is within the range of values of the specified parameter. The method can further include receiving, by the processing circuitry, a request to adjust a value of a parameter of the plurality of parameters. The method can further include, in response to receiving the request, performing, by the processing circuitry, a parameter value adjustment operation on the image to produce an edited image, the parameter value adjustment operation being configured to adjust the value of the parameter of each of the plurality of pixels based on the value of the spatial mask and the value of the range mask.

The details of one or more implementations are set forth in the accompanying drawings and the description below. Other features will be apparent from the description and drawings, and from the claims.

DETAILED DESCRIPTION

Figure 1:
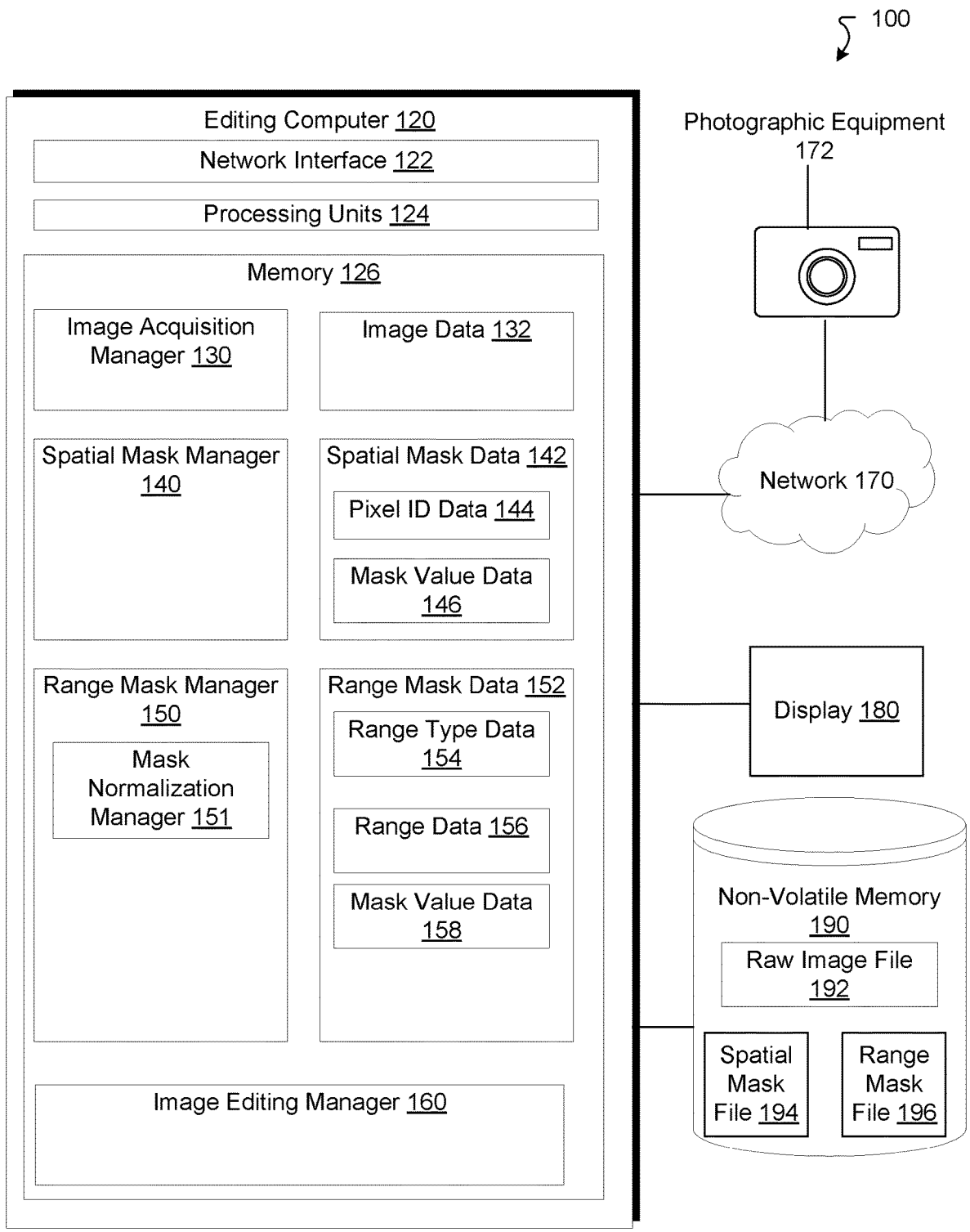
FIG. 1 is a diagram that illustrates an example electronic environment in which improved techniques described herein may be implemented.

The above-described conventional approach to editing pictures using a digital picture editing tool results in a complex, multi-step workflow that is time-consuming and limited in accuracy. For example, it may be difficult define accurate masks in the above-described tree with red leaves in foliage because the spatial boundary is very irregular. In many cases, the irregular boundaries are made up of straight elements that are each smaller than a pixel. Along these lines, a user wanting to make local adjustments to the red leaves would need to define a region that does not cover all pixels having a red color or pixels that do not have red color. Accordingly, the local adjustments may either fail to take place in regions that a user intended or may happen in regions the user did not intend.

Further, because of the complexity of the work-flow involved in defining them, such spatial masks result in destructive edits to a picture, i.e., edits that cannot be undone easily. In contrast, when edits are simple, such edits may be expressed in a form, e.g., an XML script, that may be saved separately from the original image. In this way, the original image is preserved by default. Nevertheless, in situations where the edits become sufficiently complex, e.g., in the example above involving the red leaves, such edits may only be usable as direct changes to the image itself.

In accordance with the implementations described herein and in contrast to the above-described approaches to editing images using a digital image editing tool, improved techniques of editing images using a digital image editing tool involve defining a local adjustment that includes, as separate masks, a spatial mask and a range mask. The spatial mask specifies a region of the image to be adjusted and the range mask specifies ranges of colors and tones to be adjusted independent of the region specified by the spatial mask. In applying these masks, when a user changes a setting in the digital image editing tool, the digital image editing tool weights the effect of the setting according to the values of the spatial mask and the range mask for each pixel of the image.

In some implementations, the user may select, as a range mask, a luminance range mask that specifies a value of 1 for pixels having a luminance value with a selected range and 0 for pixels having a luminance value outside that range.

Similarly, when a user selects a region of the image for editing, the digital image editing tool specifies a spatial mask value of 1 for each pixel inside that region and 0 for each pixel outside the region. Accordingly, when the user makes an adjustment a value of a parameter (e.g., changing contrast or brightness), the digital image editing tool weights the change in value of that parameter by the spatial mask value and the luminance range mask value. The weighting is applied to all pixels of the image, although many of those weights are zero, implying no change to that parameter in those pixels. In some implementations, the digital image editing tool forms, as an overall mask weight, the product of the spatial mask value and the luminance range mask value. In some implementations, the overall mask weight may be a different combination of the spatial mask value and the range mask value, e.g., a convolution of the spatial mask value and the range mask value.

In some implementations, the user may select, as a range mask, a color range mask that specifies a value of 1 for pixels having a color value with a selected range and 0 for pixels having a luminance value outside that range. In some arrangements, the color range mask includes a point model in which a single point of an Lab color space is chosen as the range. In some arrangements, the color range mask includes an area model in which a region of the Lab color space is chosen as the range; this range turns out to be a tubular volume in Lab space.

In some implementations, the range mask has a smoothing function so that the transition from inside the range to outside is smooth rather than binary. In one example, the luminance range mask may have a Gaussian smoothing function at the edges of the luminance range. In another example, the point model of the color range mask may have, as values of the range mask, a 3D Gaussian function in Lab space, centered on the single point. In another example, the area model of the color range mask may have a Gaussian smoothing function at the surface of the tubular volume in Lab space.

In some implementations, upon obtaining the image, the digital image editing tool first normalizes the image in such a way that any initial image of the same scene is represented as the same normalized image. The ranges of values of the various parameters that the user may change in the digital image editing tool are then changed in the context of the normalized image. In some implementations, the normalization of the image involves converting a raw RGB color space of the image to a Lab color space of the image, forming a histogram of luminance across the pixels of the image, and then redistributing the luminances to equalize the heights of the histogram bins.

In some implementations, the spatial mask and the range mask are stored separately from the initial, raw image so that the edits made by the user are non-destructive in the sense that the original image may be recovered when needed.

The above-defined local adjustment makes it easier to make more accurate adjustments to a picture with less effort. In contrast to the conventional approach, the specification of the region of the spatial mask may be done at a coarse level so long as it includes the actual regions to be adjusted. The fine-tuning of features in the picture is accomplished through the range mask, which may be specified with relative ease by the user. Finally, the changes specified in the spatial mask and the range mask are relatively simple and may be stored in separate, e.g., XML files so that the editing process may be non-destructive.

FIG. 1 is a diagram that illustrates an example electronic environment 100 in which the above-described improved techniques may be implemented. As shown, in FIG. 1, the electronic environment 100 includes an editing computer 120, a network 170, photographic equipment 172, a display 180, and a non-volatile memory 190.

The editing computer 120 is configured to edit images. The editing computer 120 includes a network interface 122, one or more processing units 124, and memory 126. The network interface 122 includes, for example, Ethernet adaptors, Token Ring adaptors, and the like, for converting electronic and/or optical signals received from a network to electronic form for use by the editing computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the editing computer 120 can be, or can include processors (e.g., processing units 124) configured to process instructions stored in the memory 126. Examples of such instructions as depicted in FIG. 1 include an image acquisition manager 130, a spatial mask manager 140, a range mask manager, and an image editing manager 160. Further, as illustrated in FIG. 1, the memory 126 is configured to store various data, which is described with respect to the respective managers that use such data.

The image acquisition manager 130 is configured to obtain image data 132 from some image source. As shown in FIG. 1, the image acquisition manager 130 obtains image data 132 from photographic equipment 172 over the network 170. In some implementations, the image acquisition manager 130 obtains image data 132 from a raw image file 192 stored in an external, non-volatile memory 190.

The image data 132 represents an image of a scene and/or an object. In some implementations, the image data 132 is a color image expressed in RGB coordinates, e.g., as 8-bit integer intensities (from 0 to 255) of red, green, and blue color channels. The image data 132 includes a number of pixels (e.g., 2048×1536 in an HD image), each pixel having a single value of each of the color channels.

The spatial mask manager 140 is configured to generate spatial mask data 142. In some arrangements, the spatial mask manager 140 receives data from a graphical user interface (GUI) of the image editing manager 160 indicating a region of the image represented by the image data 132 and as shown on the display 180. For example, the user may define a region of the image by simultaneously moving a mouse and holding a mouse button over the image as displayed on the display 180.

As shown in FIG. 1, the spatial mask data 142 includes pixel identification data 144 and mask value data 146. In some implementations, the pixel identification data 144 includes a pair of integers (e.g., between 0 and 2047 and between 0 and 1535) indicating the position of a pixel within the image. In some implementations, the pixel identification data 144 includes a single integer that represents an address of a pixel within the image. The mask value data 146 is a number that indicates whether a pixel is inside or outside the region indicated by the user. For example, the mask value data 146 may take the value 1 when the pixel is inside the region and 0 when the pixel is outside the region. In some implementations, the mask value data 146 may take on other values when the pixel is sufficiently close to a boundary of the region, e.g., a number between 0 and 1.

The range mask manager 150 is configured to generate range mask data 152. In some arrangements, the range mask manager 150 receives the range mask data 152 from, for example, a GUI of the image editing manager 160 indicating a range type 152, e.g., luminance or color. Depending on the range type data 152, the range mask manager 150 receives the range mask data 152 from a slider bar in the GUI or from a user simultaneously moving a mouse and holding a mouse button over a region of the image as displayed on the display 180.

The range mask data 152 includes range type data 154, parameter identification data 154, range data 156, and mask value data 158. In some implementations, the range type data 154 indicates luminance range data or color range data. In some implementations, the color range data further indicates point-type or area-type. The range data 154 includes a set of numbers defining a range in the context of the range type indicated in the range type data 154. For example, when the range type data 154 indicates luminance range data, then the range data 156 may take the form of a range of luminance values. In that case, the mask data 158 may take the form of one-dimensional mapping between a luminance value and a number. Along these lines, in some implementations, the mask data 158 may map a luminance value to 1 when the luminance value is inside the range specified by the user and 0 outside that range. In some implementations, the value to which a luminance value is mapped may be a number between 0 and 1 when the luminance value is sufficiently close to an edge of the range. The range mask data 152 is described in more detail with regard to FIGS. 3-7.

The mask normalization manager 151 is configured to perform a normalization operation on the image data 132. In some implementations, the mask normalization manager 151 is configured to convert image data in RGB color space to Lab color space by extending each channel to its full extent. In some implementations, the mask normalization manager 151 is configured to form a histogram of luminance values over the pixels of the image data 132 and adjust the luminance values of each pixel to produce a histogram with constant bin heights. In some implementations, the mask normalization manager 151 is configured to remove imperfections in the image data 132 due to, e.g., distortions of lenses in the photographic equipment 172.

The image editing manager 160 is configured to perform editing operations on the image data 132 in response to commands from the user. In some implementations, the commands are received from the user via a GUI shown on the display 180. In some implementations, the commands received from the GUI take the form of setting values of parameters according to, e.g., a position of a button on a slider bar as well as the spatial mask value data 146 and the range mask value data 158. The image editing manager 160 is also configured to provide local adjustment tools such as a brush, a linear gradient, and a radial gradient.

The network 170 is configured and arranged to provide network connections between the editing computer 120 and the photographic equipment 172. The network 170 may implement any of a variety of protocols and topologies that are in common use for communication over the Internet or other networks. Further, the network 170 may include various components (e.g., cables, switches/routers, gateways/bridges, etc.) that are used in such communications.

The display 180 is configured to display the image data 132 within a GUI provided by the image editing manager 160.

The non-volatile memory 190 is configured to store a raw image file 192 containing image data prior to any normalization or editing, a spatial mask file 194 containing spatial mask data 142, and a range mask file containing the range mask data 152. In some implementations, the spatial mask file 194 and the range mask file 196 each have an XML format.

The components (e.g., modules, processing units 124) of the editing computer 120 can be configured to operate based on one or more platforms (e.g., one or more similar or different platforms) that can include one or more types of hardware, software, firmware, operating systems, runtime libraries, and/or so forth. In some implementations, the components of the editing computer 120 can be configured to operate within a cluster of devices (e.g., a server farm). In such an implementation, the functionality and processing of the components of the editing computer 120 can be distributed to several devices of the cluster of devices.

The components of the editing computer 120 can be, or can include, any type of hardware and/or software configured to process attributes. In some implementations, one or more portions of the components shown in the components of the editing computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the editing computer 120 can be, or can include, a software module configured for execution by at least one processor (not shown). In some implementations, the functionality of the components can be included in different modules and/or different components than those shown in FIG. 1.

In some embodiments, one or more of the components of the editing computer 120 can be, or can include, processors configured to process instructions stored in a memory. For example, an image acquisition manager 130 (and/or a portion thereof), a spatial mask manager 140 (and/or a portion thereof), a range mask manager 150 (and/or a portion thereof), and an image editing manager 160 (and/or a portion thereof) can be a combination of a processor and a memory configured to execute instructions related to a process to implement one or more functions.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the editing computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the editing computer 120. As illustrated in FIG. 1, the memory 126 is configured to store various data, including image data 132, spatial mask data 142, and range mask data 152.

Figure 2:
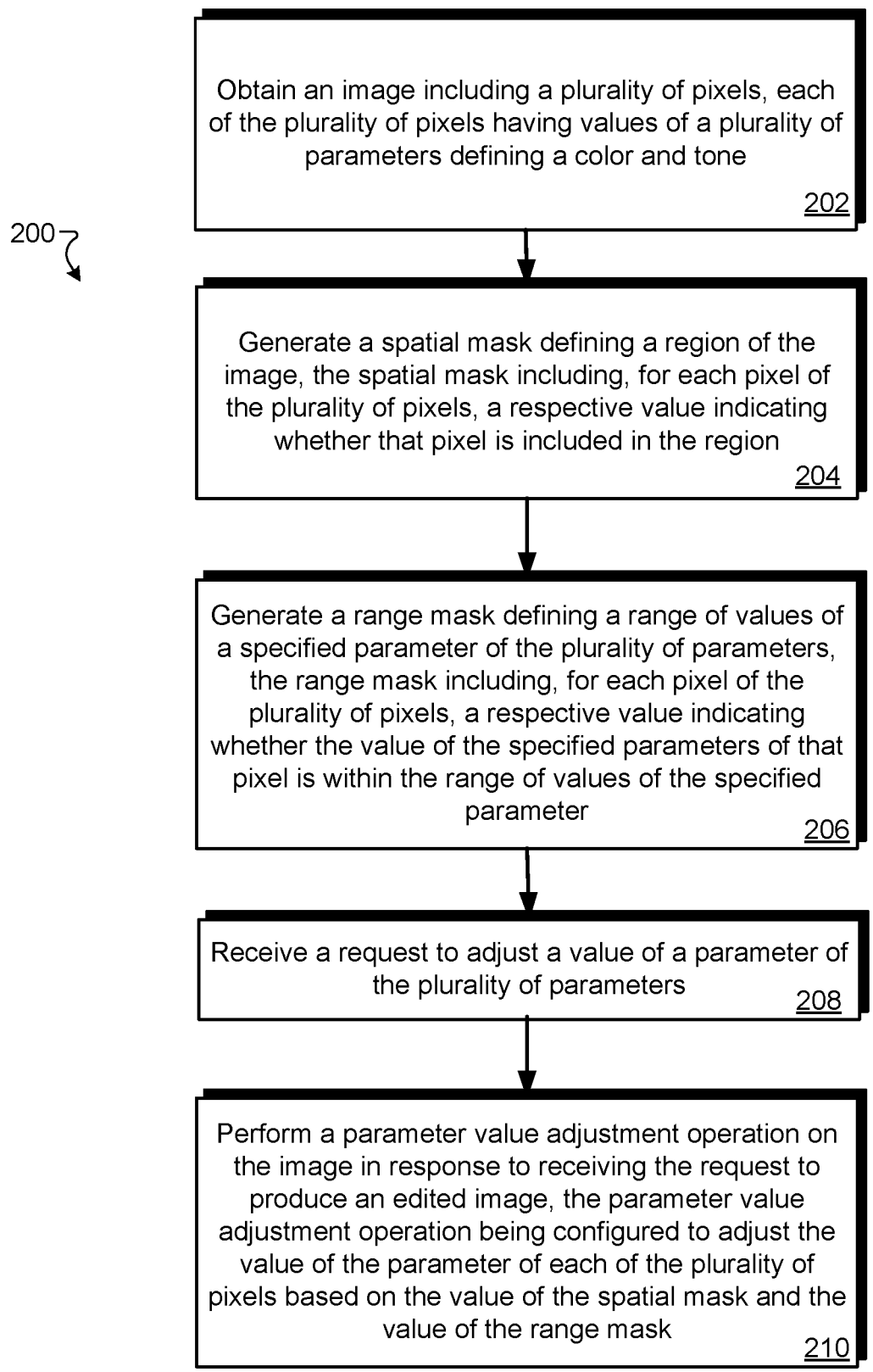
FIG. 2 is a flow chart that illustrates an example method of implementing the improved techniques as shown in FIG. 1.

FIG. 2 is a flow chart depicting an example method 200 of editing images using a digital picture editing tool. The method 200 may be performed by software constructs described in connection with FIG. 1, which reside in memory 126 of the editing computer 120 and are run by the set of processing units 124.

At 202, the editing computer 120 (FIG. 1) obtains image data 132 including a plurality of pixels, each of the plurality of pixels having values of a plurality of parameters defining a color and tone. The image data 132 may come over a network, e.g., network 170 via photographic equipment 172, or via non-volatile storage 190.

At 204, the editing computer 120 generates a spatial mask defining a region of the image. The spatial mask includes, for each pixel of the plurality of pixels, a respective value indicating whether that pixel is included in the region.

At 206, the editing computer 120 generates a range mask defining a range of values of a specified parameter. The range mask includes, for each pixel of the plurality of pixels, a respective value indicating whether the value of the specified parameters of that pixel is within the range of values of the specified parameter.

At 208, the editing computer 120 receives a request to adjust a value of a parameter of the plurality of parameters.

At 210, the editing computer 120, in response to receiving the request, performs a parameter value adjustment operation on the image to produce an edited image. The parameter value adjustment operation is configured to adjust the value of the parameter of each of the plurality of pixels based on the value of the spatial mask and the value of the range mask.

Figure 3:
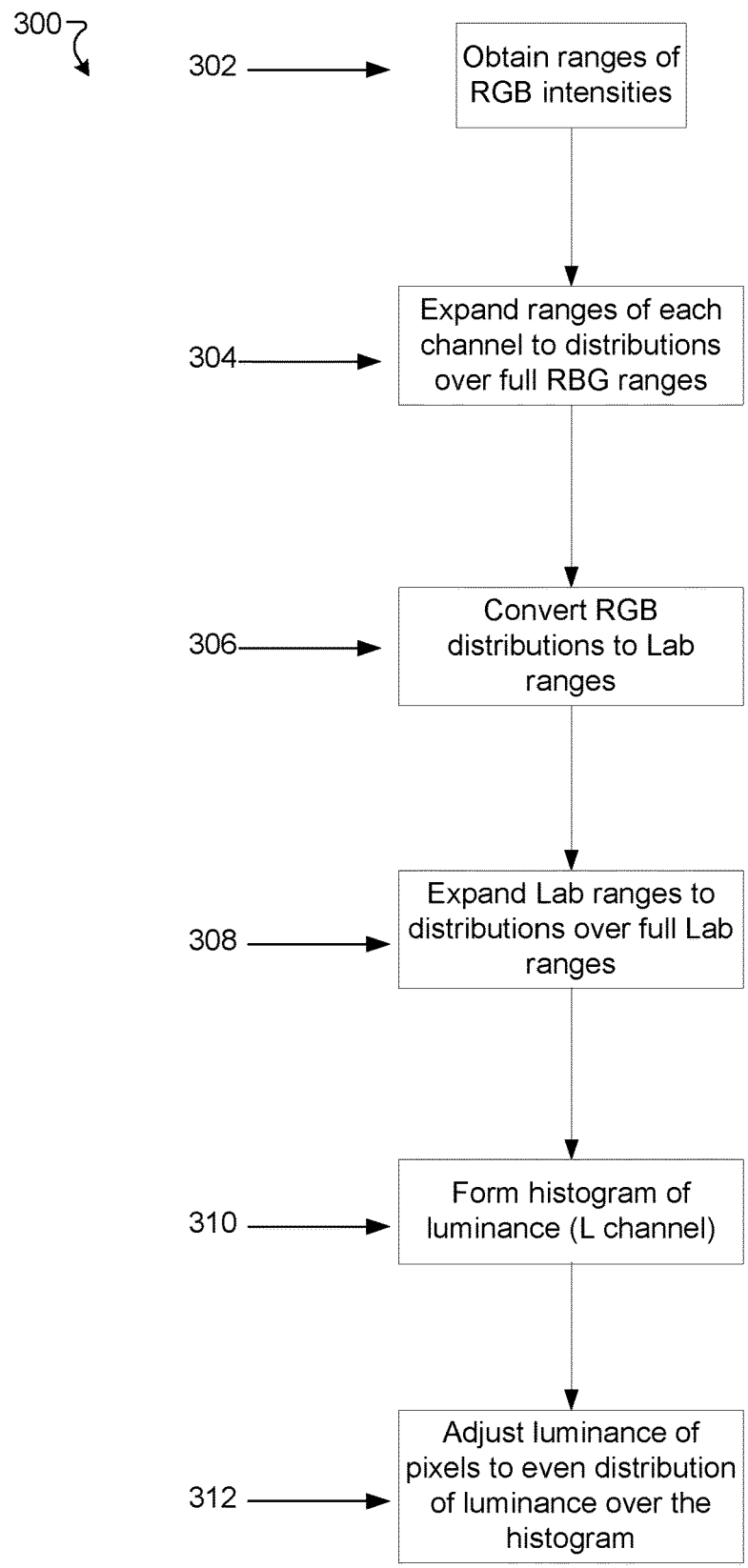
FIG. 3 is a flow chart that illustrates an example process of normalizing an image according to the improved techniques shown in FIG. 1.

FIG. 3 is a flow chart illustrating an example process 300 of normalizing image data. The process 300 may be performed by software constructs described in connection with FIG. 1, which reside in memory 126 of the editing computer 120 and are run by the set of processing units 124.

At 302, the editing computer 120 obtains, from the image data, e.g., image data 132, ranges of intensities of red, green, and blue color channels in the RGB color space. In some implementations, other color spaces may be used, e.g., YUV color space, with other color channels.

At 304, the editing computer 120 performs a transformation on each of the RGB color channels to expand the ranges of each color channel into distributions of intensities over a full color range. For example, suppose that the red color channel takes the values 50-200 over all pixels in the image data. Then the editing computer 120 rescales the range of red color intensities to 0-255, with values originally at 50 being mapped to 0, values at 200 being mapped to 255, and some interpolation used to map values in between. This expansion of the red color range is repeated over the green and blue color ranges.

At 306, the editing computer 120 converts the full-ranged channels in the RGB color space to ranges of channels in the Lab color space. Because RGB color space is device-dependent, the RGB color space must first be transformed to a device-independent representation such as sRGB before conversion to Lab.

At 308, the editing computer 120 performs a transformation on each of the Lab channels to expand the ranges of each Lab channel into distributions over the full ranges of the channels. In some implementations, the full range of the L (luminance) channel is between 0 and 100, and the full range of each of the a (green-red) and b (blue-yellow) color channels is between −128 and +127. In some implementations, the L channel corresponds to a "lightness," which is the cube root of the luminance. Nevertheless, because of the simple, direct relation between brightness and luminance, the L channel will refer to luminance.

At 310, the editing computer 120 forms a histogram of luminance from luminance values of each of the pixels of the image data. The histogram has bins of luminance subranges and there can be as many as 101 (for each value 0 to 100) such bins.

At 312, the editing computer 120 adjusts the luminance values of the pixels of the image data so that the bins of the histogram have the same height, e.g., the luminance values are evenly distributed over the image data. The resulting image data represents a normalized image.

Figure 4A:
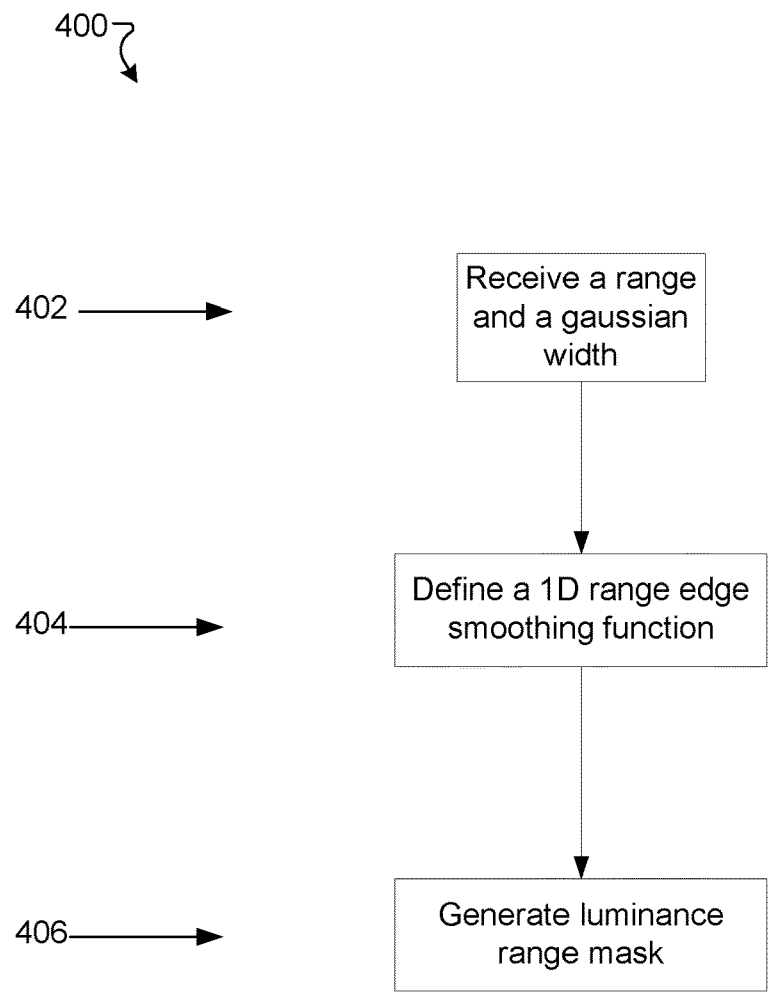
FIG. 4A is a flow chart that illustrates an example process of generating a luminance range mask according to the improved techniques shown in FIG. 1.

FIG. 4A is a flow chart illustrating a process 400 of generating a luminance range mask. The process 400 may be performed by software constructs described in connection with FIG. 1, which reside in memory 126 of the editing computer 120 and are run by the set of processing units 124.

At 402, the editing computer 120 receives a range of luminance values and a Gaussian width. The range of luminance values, in some implementations, is received as a result of a two-thumb slider in a GUI of the image editing manager 160 displayed on the display 180. The Gaussian width represents the width of a 1D Gaussian function as a function of luminance centered on each of the range edges. The 1D Gaussian function thus represents an edge smoothing operation for the luminance mask. In some implementations, the Gaussian width is received as a result of a slider in the GUI.

At 404, the editing computer 120 defines, from the range and the Gaussian width, a 1D range edge smoothing function as described above. For example, for pixels having luminance values outside of the range but sufficiently close to an edge of the range, the editing computer computes, as the luminance range mask value, the value of the Gaussian centered on the range edge and having the Gaussian width.

At 406, the editing computer 120 generates the luminance range mask from the range and the 1D range edge smoothing function as described above. The editing computer 120 employs the luminance range mask as the range mask when the user makes an adjustment to an image editing parameter, e.g., contrast, brightness, saturation. etc.

Figure 4B:
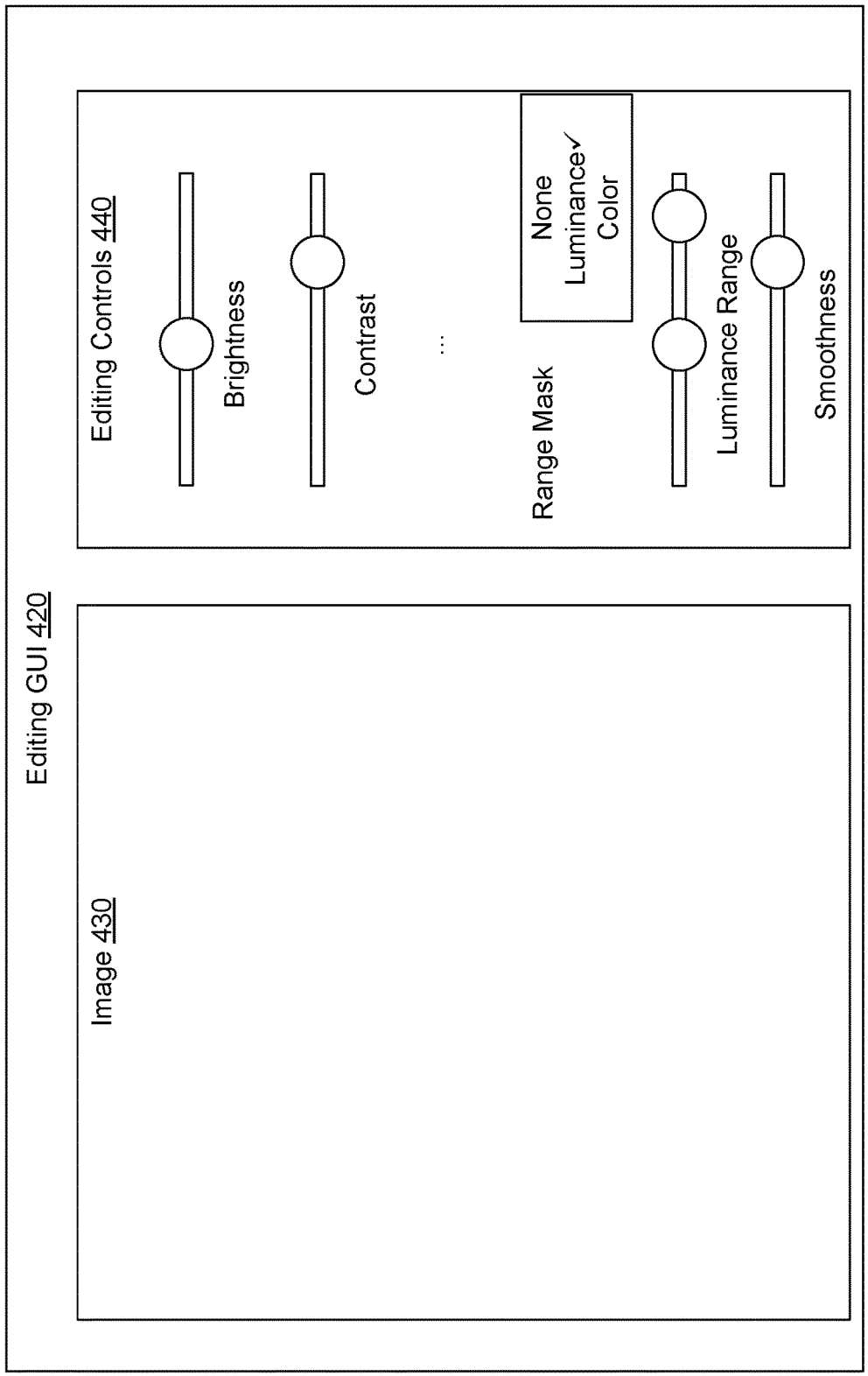
FIG. 4B is a diagram that illustrates an example GUI in which a luminance range mask is chosen according to the improved techniques shown in FIG. 1.

FIG. 4B is a diagram illustrating an example GUI 420 used to generate the luminance range mask as described above and displayed on display 180. The GUI 420 takes the form of a window including a display of the image 430 represented by the image data 132 and a set of editing controls 440.

In the image window 430, the editing computer 120 provides a region selection tool, e.g., a brush, by which the user may select a region for the spatial mask for local adjustment. In contrast to the above-described conventional approaches, the user need not worry about being accurate and may draw a coarsely-defined region in the drawing window. The only requirement is that the region drawn by the user encompasses the actual region in which the adjustments are to be made. For example, suppose that the scene in the picture includes a tree with red leaves against a blue rocky background. If the user wishes to adjust the contrast of the blue background against the red leaves, then the user merely needs to draw a region including the blue background using the brush, linear gradient, or radial gradient according to the intent of the adjustments (e.g., with or without shadow effects).

In the editing controls window, there are sliders representing possible values of various parameters such as brightness and contrast. There is a range mask selector that includes a drop-down menu for selecting no range mask, a luminance range mask, or a color range mask. In the example shown in FIG. 4B, the luminance range mask is selected. In response to this selection, a two-thumb selector for the luminance range and a slider for the smoothness (e.g., Gaussian width) appear. The editing computer 120 receives values of these parameters and generates the luminance range mask according to the values selected in these controls.

Figure 5A:
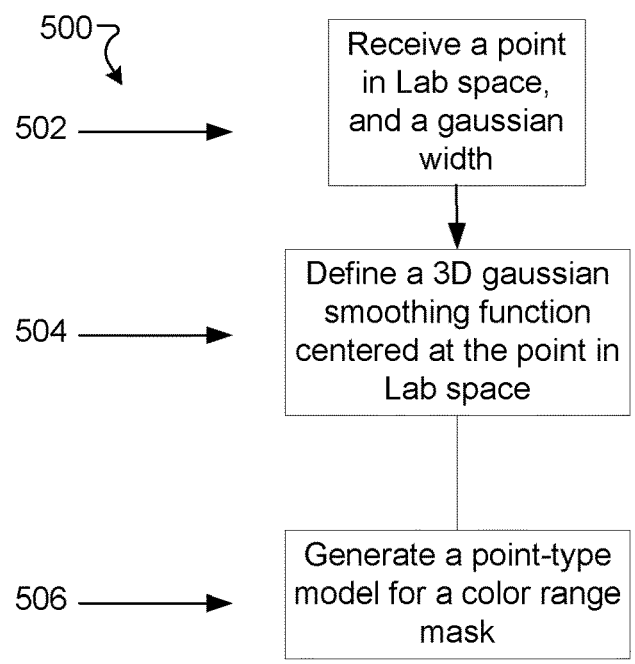
FIG. 5A is a flow chart that illustrates an example process of generating a point-type model for a color range mask according to the improved techniques shown in FIG. 1.

FIG. 5A is a flow chart illustrating an example process 500 of generating a point-model color range mask. The process 500 may be performed by software constructs described in connection with FIG. 1, which reside in memory 126 of the editing computer 120 and are run by the set of processing units 124.

At 502, the editing computer 120 receives a single point in the Lab color space and a Gaussian width. The single point is received in response to a mouse click by the user in a window representing the RGB color space. The point in RGB color space may then be converted to a point in the Lab color space. The Gaussian width represents the width of a 3D Gaussian smoothing function centered on the single point. In some implementations, the Gaussian width is received as a result of a slider in the GUI.

At 504, the editing computer 120 defines, from the single point and the Gaussian width, a 3D Gaussian smoothing function as described above. For example, for pixels having Lab color channel coordinates outside of but sufficiently close to the single point, the editing computer 120 computes, as the color range mask value, the value of the 3D Gaussian centered on the single point and having the Gaussian width.

At 506, the editing computer 120 generates the color range mask from the single point and the 3D Gaussian smoothing function as described above. The editing computer 120 employs the color range mask as the range mask when the user makes an adjustment to an image editing parameter, e.g., contrast, brightness, saturation. etc.

Figure 5B:
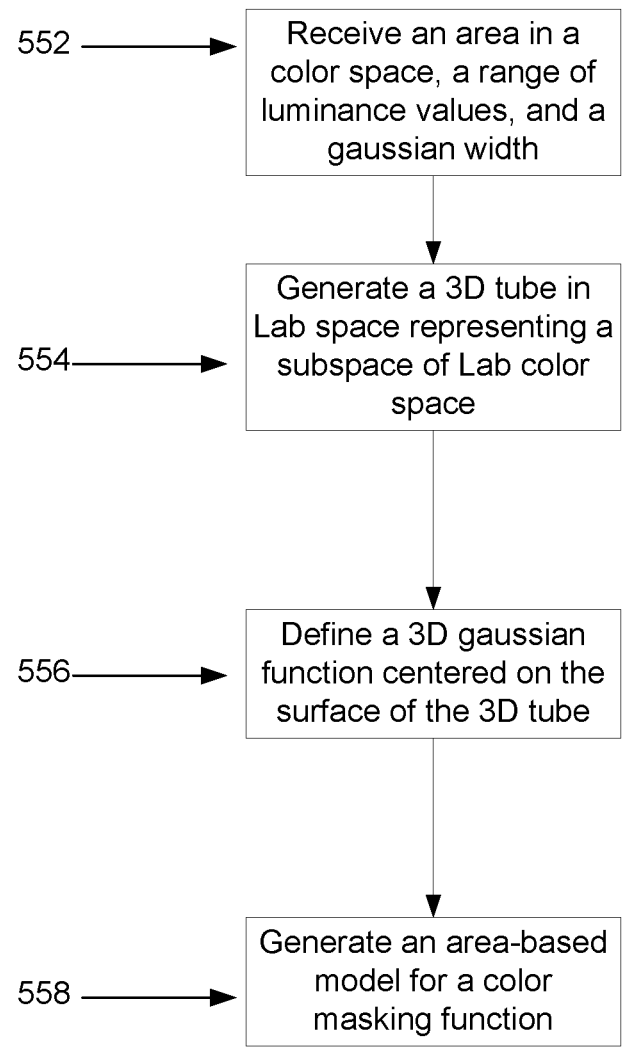
FIG. 5B is a flow chart illustrating an example process of generating an area-type model for a color range mask according to the improved techniques shown in FIG. 1.

FIG. 5B is a flow chart illustrating an example process 550 of generating an area-model color range mask. The process 550 may be performed by software constructs described in connection with FIG. 1, which reside in memory 126 of the editing computer 120 and are run by the set of processing units 124.

At 552, the editing computer 120 receives a region in a color space and a Gaussian width. The region is received in response to a click and drag motion by the user in a window representing a color palette used to select colors in the editing manager 160. Such a region is rectangular but, in some implementations, is a non-rectangular shape. The Gaussian width represents the width of a 3D Gaussian smoothing function. In some implementations, the Gaussian width is received as a result of a slider in the GUI.

At 554, the editing computer 120 generates a three-dimensional tubular volume in Lab color space based on the selected region in the color palette. This tubular region represents a subspace of the Lab color space for which adjustments to the image will be made. Further details about this subspace are discussed with regard to FIG. 6.

At 556, the editing computer 120 defines, from the three-dimensional tubular volume and the Gaussian width, a 3D Gaussian smoothing function as described above. For example, for pixels having Lab color channel coordinates outside of but sufficiently close to the three-dimensional tubular volume, the editing computer 120 computes, as the color range mask value, the value of the 3D Gaussian that falls off with distance from the surface of the three-dimensional tubular volume and having the Gaussian width.

At 558, the editing computer 120 generates the color range mask from the three-dimensional tubular volume and the 3D Gaussian smoothing function as described above. The editing computer 120 employs the color range mask as the range mask when the user makes an adjustment to an image editing parameter, e.g., contrast, brightness, saturation. etc.

Figure 5C:
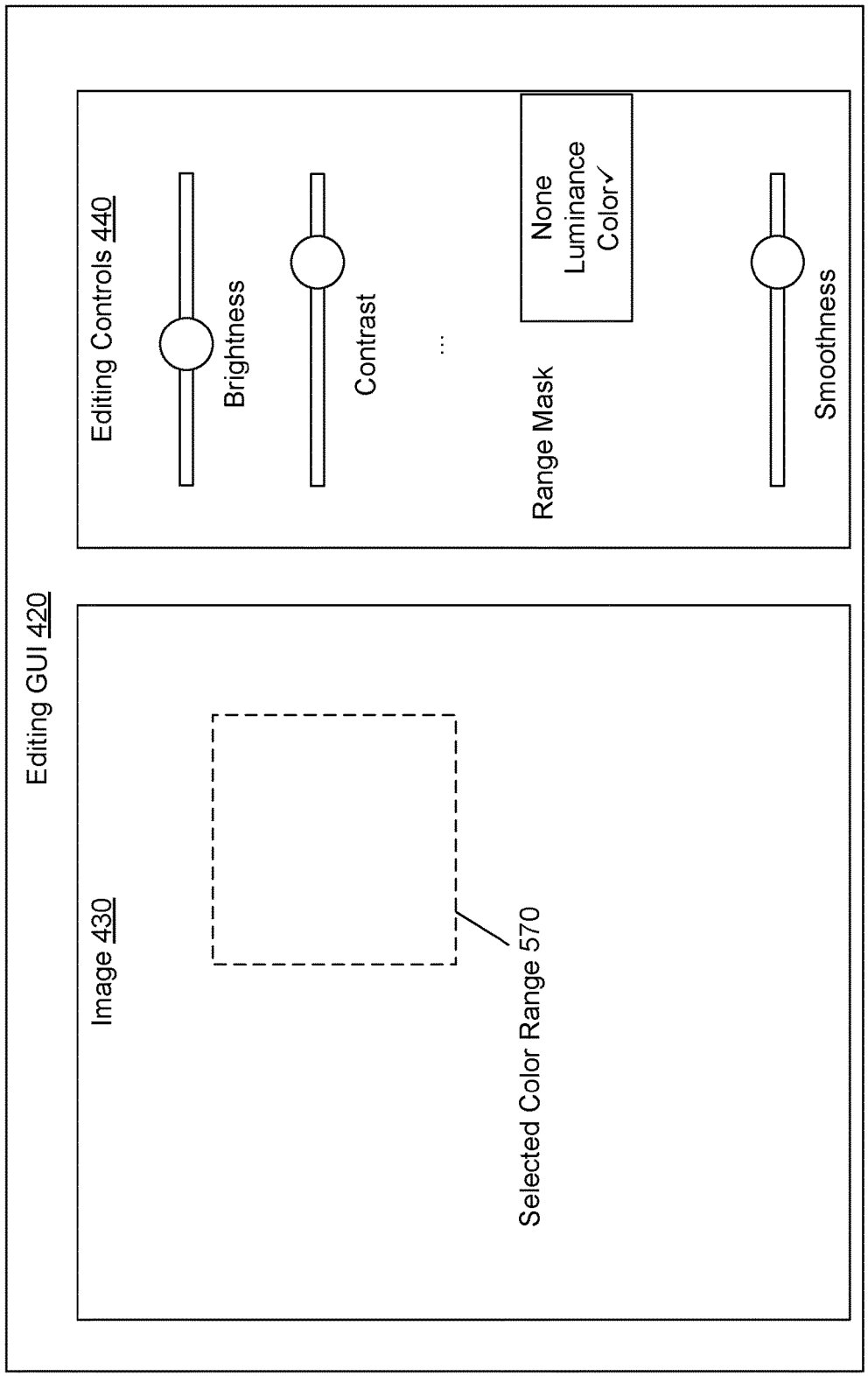
FIG. 5C is a diagram that illustrates an example GUI in which a color range mask is chosen according to the improved techniques shown in FIG. 1.

FIG. 5C is a diagram illustrating an example GUI 420 as shown in FIG. 3B, but used to generate the color range mask as described above and displayed on display 180. The GUI 420 takes the form of a window including a display of the image 430 represented by the image data 132 and a set of editing controls 440. In this case, the drop-down menu in the editing control window 440 is set to the color range mask option.

In this case, for an area-type color mask, the user performs a click-and-drag motion with a mouse to select a color region 570 over a color palette. (For the point-type color range mask, the user clicks on a single point.) The editing computer 570 then converts this region of the color palette to a volume within the Lab color space.

In some implementations, there may be other color range masks that are a combination of the point-model and area-model color range masks. For example, such a combination may be weighted by taking the combination to be that which produces a minimum value at a given point in the Lab color space. Other constraints may produce other combinations of the point-model and area-model.

In some implementations, the editing computer 120 provides an inversion function that replaces the value of the color range mask with one minus that value. In this way, a user would effectively be specifying a color then, e.g., clicking an inversion control (e.g., a checkbox) that creates a mask which is everything inside the color range model space except for the color range(s) that were specified.

Figure 6:
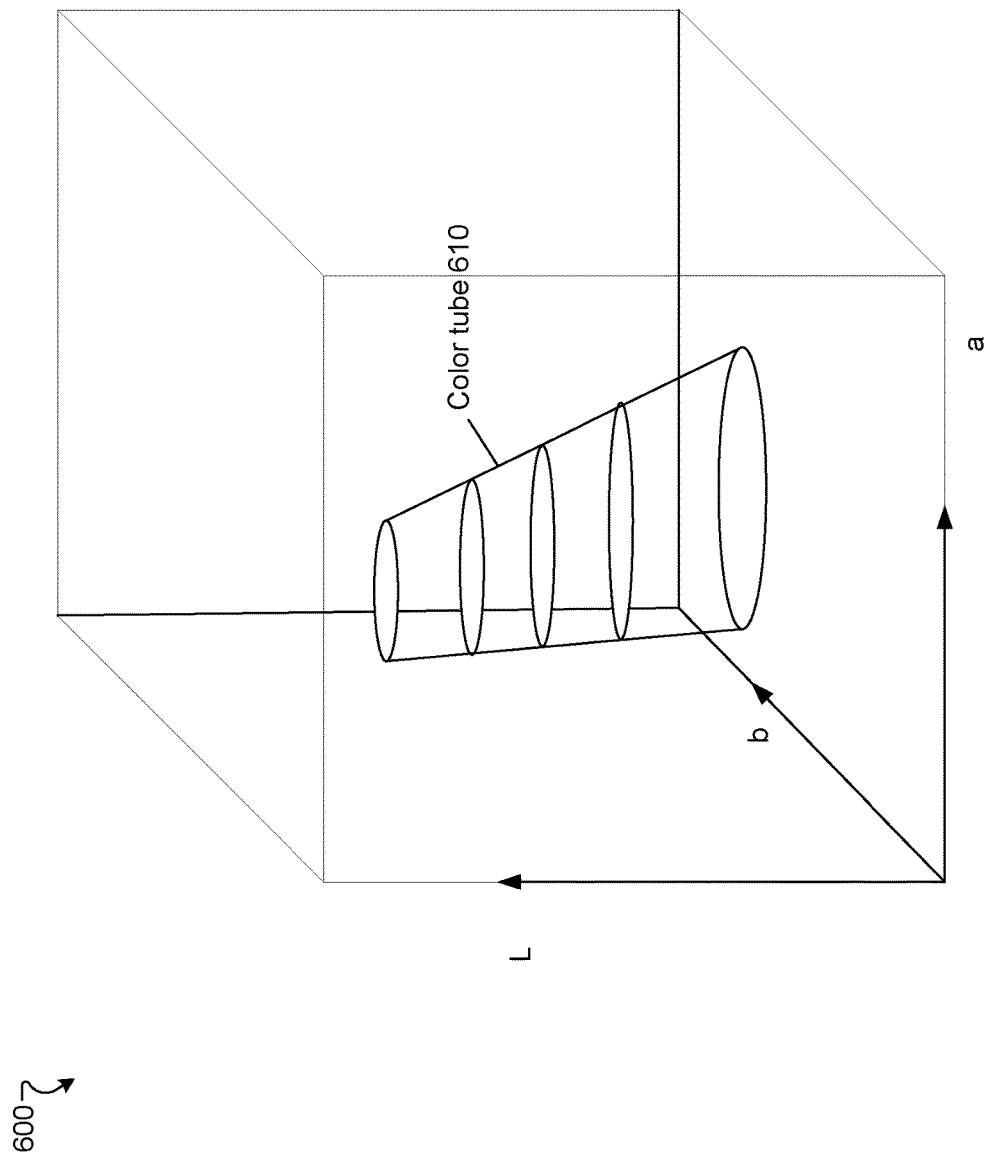
FIG. 6 is a diagram that illustrates an example tubular volume in Lab color space that represents a range for a color-type model for a color range mask according to the improved techniques shown in FIG. 1.

FIG. 6 is a diagram illustrating an example tubular volume 610 within the Lab color space 600 that is the result of converting the region 570 to the Lab color space. In this case, the cross-sections of the tube are circular and the lateral surface is linear. In some implementations, the lateral surface may be curved.

Pixels of the image having Lab values that lie inside the tube 610 may have a color range mask value of 1 while those lying outside may have a color range mask value of 0. For points close to the tube, the editing computer may compute, as the color range mask value, a 3D Gaussian function centered on the surface of the tube 610. In some implementations, the 3D Gaussian function may be approximated with a polynomial for faster computation. It has been found that a cubic polynomial provides the speed and accuracy needed in such an approximation.

Using the various range masks in conjunction with the spatial mask described above, images with even the most irregular boundaries may be edited accurately, easily, and non-destructively using the editing computer 120.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method for fine-level tuning of an image, comprising:
   obtaining, by processing circuitry of a computer, a first image including a plurality of pixels, wherein a pixel includes a set of values corresponding to a set of parameters defining a color and tone;
   receiving user input comprising a user drawing around a coarsely-defined region of the first image that encompasses an adjustment region in which adjustments are to be made;
   generating, by the processing circuitry, a spatial mask indicating the coarsely-defined region of the first image, the spatial mask including, for the plurality of pixels, respective values indicating whether the pixels are included in the adjustment region;
   generating, by the processing circuitry, a range mask defining a range of values of a user-specified parameter, the range mask including, for the plurality of pixels, respective values indicating whether a value of the user-specified parameter of the pixels is within the range of values of the user-specified parameter;
   receiving, by the processing circuitry, a request to adjust a value of a parameter of the set of parameters; and
   in response to receiving the request, performing, by the processing circuitry, a parameter value adjustment operation on the first image to produce a second image, the parameter value adjustment operation comprising an adjustment of the value of the parameter of the plurality of pixels by weighting the adjustment of the value of the parameter of the plurality of pixels by a combination of the value of the spatial mask and the value of the range mask, the second image resulting from the fine-level tuning of the first image over the adjustment region.

2. The method as in claim 1, wherein generating the range mask includes generating, as the range mask, a color range mask, the color range mask defining a range of values of intensities of at least one color of a plurality of colors of a pixel.

3. The method as in claim 2, wherein generating the color range mask includes:
   receiving color range data including range type data, wherein the range type data comprises an indication as to whether the color range mask includes a point model or an area model, the point model being based at a single point of a Lab color space, the area model being based on a contiguous region of the Lab color space.

4. The method as in claim 3, wherein, in response to the color range mask being based on the point model, generating the color range mask further includes:
   generating a 3D smoothing function that defines values of the color range mask at the single point of the Lab color space and a neighborhood of points in a vicinity of the single point.

5. The method as in claim 4, wherein generating the 3D smoothing function includes:
   receiving a Gaussian width value; and
   generating, as the 3D smoothing function, a Gaussian function centered at the single point and having as a width the Gaussian width value.

6. The method as in claim 1, further comprising:
   in response to obtaining the first image, saving the first image in a memory of the computer; and
   generating a spatial mask file comprising spatial mask data that includes pixel identifiers identifying the plurality of pixels and, for the plurality of pixels, the respective values of the spatial mask; and
   generating a range mask file comprising range mask data that includes a parameter identifier identifying the user-specified parameter, the range of values of the user-specified parameter, and the value of the range mask for the user-specified parameter.

7. A computer program product comprising a nontransitory storage medium, the computer program product including code that, when executed by processing circuitry of a computer configured to enable a user to perform a fine-level tuning of an image over a coarsely-defined region of the image, causes the processing circuitry to perform a method, the method comprising:
   obtaining a first image including a plurality of pixels having values of a plurality of parameters defining a color and tone;
   receiving user input comprising a user drawing around the coarsely-defined region of the first image that encompasses an adjustment region in which adjustments are to be made;
   generating a spatial mask indicating the coarsely-defined region of the first image, the spatial mask including, for the plurality of pixels, respective values indicating whether the pixels are included in the adjustment region;
   generating a range mask defining a range of values of a user-specified parameter of the plurality of parameters, the range mask including, for the plurality of pixels, respective values indicating whether a value of the user-specified parameter is within the range of values of the user-specified parameter;
   receiving a request to adjust a value of a parameter of the plurality of parameters; and
   in response to receiving the request, performing a parameter value adjustment operation on the first image to produce a second image, the parameter value adjustment operation comprising an adjustment of the value of the parameters of the plurality of pixels by weighting the adjustment of the value of the parameters of the plurality of pixels by a combination of the value of the range mask and the value of the spatial mask, the second image resulting from the fine-level tuning of the first image over the coarsely-defined region,
wherein generating the range mask includes:
receiving a Gaussian width value; and
generating a 3D smoothing function centered at a point of a color space and defining values of intensities of at least one color at the point and in a vicinity of the point.

8. The computer program product as in claim 7, wherein the parameter value adjustment operation is further configured to adjust the value of the parameters of the plurality of pixels based on the value of the spatial mask.

9. The computer program product as in claim 7, wherein generating the spatial mask includes:
applying a local adjustment tool to the coarsely-defined region of the first image, the local adjustment tool being one of a brush, a linear gradient, and a radial gradient.

10. The computer program product as in claim 8, wherein performing the parameter value adjustment operation on the first image includes:
generating, for the plurality of pixels, a product of the value of the spatial mask of a pixel and the value of the range mask of the pixel to produce a value of an overall mask, wherein the value of the parameter of the plurality of pixels is based on the value of the overall mask.

11. The computer program product as in claim 7, wherein the method further comprises:
in response to obtaining the first image, saving the first image in a memory of the computer; and
generating a spatial mask file comprising spatial mask data that includes pixel identifiers identifying the plurality of pixels and the respective value of the spatial mask of the pixels.

12. An electronic apparatus configured to enable a user to perform a fine-level tuning of an image over a coarsely-defined region of the image, the electronic apparatus comprising:
a network interface;
a memory; and
controlling circuitry coupled to the memory, the controlling circuitry being configured to:
obtain a first image including a plurality of pixels having values of a plurality of parameters defining a color and tone;
generate a range mask defining a range of values of a user-specified parameter of the plurality of parameters, the range mask including, for the plurality of pixels, respective value indicating whether a value of the user-specified parameter is within the range of values of the user-specified parameter, wherein the range mask comprises a color range mask defining a range of values of intensities of at least one color of a plurality of colors of a pixel, and wherein generating the color range mask includes receiving an indication as to whether the color range mask includes a point model or an area model, the point model being based at a single point of a Lab color space, the area model being based on a contiguous region of the Lab color space;
receive a request to adjust a value of a parameter of the plurality of parameters;
in response to receiving the request, perform a parameter value adjustment operation on the first image to produce a second image, the parameter value adjustment operation being configured to adjust a parameter of the plurality of pixels based on the range mask, the second image resulting from the fine-level tuning of the first image over the coarsely-defined region;
generate a range mask file comprising range mask data that includes a parameter identifier identifying the user-specified parameter, the range of values of the user-specified parameter, and the value of the range mask for the user-specified parameter,
wherein the controlling circuitry configured to obtain the first image is further configured to:
receive the first image from photographic equipment as a result of the photographic equipment capturing a scene,
wherein the controlling circuitry configured to generate the range mask is further configured to:
perform a normalization operation on the first image to produce a normalized image, the normalized image being independent of the photographic equipment used to capture the scene, the normalized image; and
produce, as the range of values of the specified parameter, a range of values of the specified parameter of pixels of the normalized image,
wherein the first image includes respective distributions of intensities of a plurality of color channels having a respective full range of intensities, and
wherein the controlling circuitry configured to perform the normalization operation on the first image is further configured to:
obtain, from the first image, respective ranges of intensities of the plurality of color channels of the first image;
expand the range of intensities of the color channels to the full range of intensities;
after expanding the range of intensities for the color channels of the first image, perform a conversion operation on the color channels to produce a full range of values of channels of a Lab color space; and
expand the range of values to the full range of values.

13. The electronic apparatus as in claim 12, wherein the controlling circuitry is further configured to:
generate a spatial mask defining a region of the first image, the spatial mask including respective values indicating whether a pixel is included in the region;
wherein the parameter value adjustment operation is further configured to adjust the values of the parameter based on the values of the spatial mask.

14. The method of claim 1, wherein:
the user input comprises holding a mouse button and moving a mouse over the first image.

15. The method of claim 1, further comprising:
receiving second user input from a slider bar in a user interface, wherein the range mask is generated based on the second user input.

16. The method of claim 1, further comprising:
normalizing at least a portion of the first image by identifying a histogram of luminance values and adjusting the luminance values to produce a normalized histogram with constant bin heights for the luminance values, wherein the parameter value adjustment operation is based on the normalizing.

17. The method of claim 1, further comprising:
normalizing at least a portion of the first image by obtaining a color range for a plurality of colors of the first image and expanding the color ranges to include a full range of color intensities, wherein the parameter value adjustment operation is based on the normalizing.

18. The method of claim 1, further comprising:
identifying a region of a three-dimensional color space defined by a tube shape having circular cross-sections, wherein the range mask is based at least in part on the region of the three-dimensional color space.

* * * * *